United States Patent
Nitschke et al.

(10) Patent No.: US 7,176,587 B2
(45) Date of Patent: Feb. 13, 2007

(54) SENSOR ADAPTED FOR CONNECTION TO A BUS AND METHOD FOR SUPPLYING POWER TO A SENSOR CONNECTED TO A BUS

(75) Inventors: Werner Nitschke, Ditzingen (DE); Klaus-Dieter Meier, Leonberg (DE); Knut Balzer, Beilstein (DE); Ewald Mauritz, Weissach (DE); Heiko Buehring, Oldenburg (DE); Hans Bogenrieder, Ingolstadt (DE); Bernd Pfaffeneder, Lappersdorf (DE); Holger Wulff, Ingolstadt (DE)

(73) Assignee: Robert Bosch GmbH, Stuttgart (DE)

( * ) Notice: Subject to any disclaimer, the term of this patent is extended or adjusted under 35 U.S.C. 154(b) by 311 days.

(21) Appl. No.: 10/473,572

(22) PCT Filed: Mar. 21, 2002

(86) PCT No.: PCT/DE02/01023

§ 371 (c)(1),
(2), (4) Date: Apr. 19, 2004

(87) PCT Pub. No.: WO02/080130

PCT Pub. Date: Oct. 10, 2002

(65) Prior Publication Data

US 2004/0172205 A1 Sep. 2, 2004

(30) Foreign Application Priority Data

Mar. 29, 2001 (DE) ................. 101 15 411

(51) Int. Cl.
*B60L 1/00* (2006.01)
(52) U.S. Cl. .................................... 307/10.1
(58) Field of Classification Search ............... 320/103; 307/10.1, 9.1; 340/438
See application file for complete search history.

(56) References Cited

U.S. PATENT DOCUMENTS

| | | | | |
|---|---|---|---|---|
| 4,903,335 A | * | 2/1990 | Shimizu | 455/343.4 |
| 5,068,640 A | * | 11/1991 | Burger et al. | 340/438 |
| 5,357,141 A | * | 10/1994 | Nitschke et al. | 307/10.1 |
| 5,375,056 A | * | 12/1994 | Nitschke et al. | 701/34 |
| 5,420,790 A | * | 5/1995 | Ravas et al. | 701/45 |
| 5,585,777 A | | 12/1996 | Johnson | |
| 5,734,318 A | * | 3/1998 | Nitschke et al. | 340/438 |
| 5,977,653 A | * | 11/1999 | Schmid et al. | 307/10.1 |

FOREIGN PATENT DOCUMENTS

| | | | |
|---|---|---|---|
| DE | 3719869 | * | 12/1988 |
| DE | 38 11 217 | | 10/1989 |
| EP | 0 547 803 | | 6/1993 |

\* cited by examiner

*Primary Examiner*—Pia Tibbits
(74) *Attorney, Agent, or Firm*—Kenyon & Kenyon LLP

(57) ABSTRACT

A sensor adapted for connection to a bus and a method for supplying power to a sensor connected to a bus are described, which serve to minimize the power consumption of a sensor connected to the bus. To this end, power for a sensor is stored in an energy storage device in a first time period and is discharged in a second time period, that is, the measurement time, in order to supply the sensor element with power. A capacitor is used as the energy storage device, and the charging of the capacitor is monitored by a voltage monitoring device.

7 Claims, 2 Drawing Sheets

SENSOR ADAPTED FOR CONNECTION TO A BUS AND METHOD FOR SUPPLYING POWER TO A SENSOR CONNECTED TO A BUS

BACKGROUND INFORMATION

The present invention relates to a sensor adapted for connection to a bus, and a method for supplying power to a sensor connected to a bus.

German Patent No. 38 11 217 describes connecting sensors for a restraint system to a bus.

SUMMARY

An example sensor adapted for connection to a bus according to the present invention, and an example method for supplying power to a sensor connected to a bus according to the present invention, may have the advantage over the related art that the power consumption of sensors connected to the bus is limited to a minimum. The sensors thereby achieve electrical characteristics of conventional igniters; that is, the operating power of the sensors is no greater than that of an igniter, making it possible to connect more sensors to a bus. This may be achieved by performing a so-called snapshot measurement, i.e., the sensors, and in particular slow sensors with a sampling rate of a few hertz, perform only a few measuring cycles and are in a sleep mode most of the time, so that they need little or no power. The measurement result is then stored in a logic module and transmitted via the bus when needed. The charging of the energy storage device for the sensor element of the sensor is monitored by a power monitoring device, in order to recognize when the energy storage device is sufficiently charged so that the sensor element may be supplied with power by the energy storage device for at least one measurement. Due to the low power consumption of the sensors, it is possible in particular to design a bus having more than seven sensors for example, and simultaneous operation of igniters.

It may be especially advantageous if an additional energy storage device is present which supplies power to the logic module in an active bus phase, i.e., when communication is taking place via the bus, since during this time the logic module cannot be supplied with power via the bus. This energy storage device is charged during the inactive bus phase.

In addition, it may be advantageous if the power monitoring device is assigned to the logic module, and thus is designed in addition as a voltage monitoring device. Hence the voltage monitoring device is constantly supplied with electrical power simultaneously with the logic module, so that the energy storage device for the sensor element is constantly monitored in regard to the electrical power stored in it.

It may also be advantageous if the energy storage devices are in the form of capacitors, which can be made small and compact.

Finally, it may also be advantageous if the logic module then stores the signals from the sensor element and sends them later via the bus. This makes it possible for a sensor to send data via the bus either on request by a bus master or automatically.

BRIEF DESCRIPTION OF THE DRAWINGS

Exemplary embodiments of the present invention are illustrated in the drawings and are explained in greater detail in the subsequent description.

DESCRIPTION OF EXAMPLE EMBODIMENTS

Because of the growing number of restraining means and sensors in a motor vehicle, it is advantageous to use a bus to connect igniters and sensors for such restraint systems together, in order to reduce the wiring complexity. In some applications it is desirable to be able to operate slow sensors having a sampling rate of a few hertz and igniters together on one bus. An example of this is the operation of belt buckle switches and occupant weight sensing, as well as the belt tensioners in a motor vehicle, on one bus.

In a typical bus system for restraint systems a control unit is used as the bus master, while sensors and igniters are operated as slaves. The slaves send their data to the master on request at predetermined time intervals. In the control unit, the sensor values are then used to calculate a triggering algorithm that results if appropriate in a triggering decision which is then transmitted via the bus to the igniters. In one particular version of a bus, which is described below, time intervals in which the slaves may transmit are assigned in an initialization phase to the connected sensors and igniters as slaves. At the same time, in these time intervals, the bus master switches the voltage on the bus lines to a lower level $U_{active}$ than is the case in the inactive bus phase $U_{inactive}$. Modulation of the power on the bus lines by the individual slaves is only allowed under $U_{active}$.

According to the present invention, the sensor is now refined so that the sensor element as a main power consumer is operated only in short measuring cycles, but is not used for measuring most of the time. The way this is achieved is that an energy storage device is charged, and only when the energy storage device has reached a predetermined threshold level does a measuring cycle begin. These measurement results are then transmitted by the sensor via the bus, either on request or automatically. Thus, the sensor element is not operated during the charging phase of the energy storage device. In a refinement, the logic module which is used to control the process in the sensor and also performs the voltage monitoring in the energy storage device is also assigned to an energy storage device that ensures that during the active communication phase, during which the logic module cannot be supplied with power via the bus, it is supplied with the necessary electrical power by this additional energy storage device.

Figure 2:
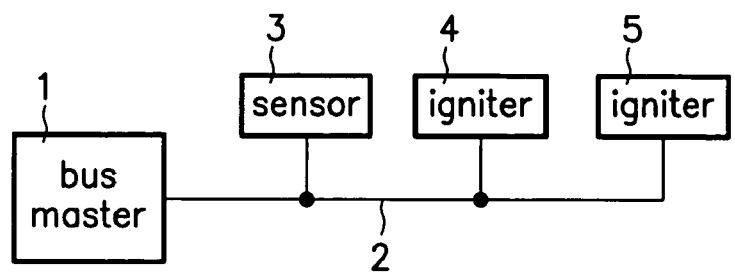
FIG. 2 shows a bus system having a connected sensor according to the present invention.

FIG. 2 shows a configuration of a bus system to which a bus master 1, which in this case is a control unit as described above, is connected via a bus line 2 with a sensor 3 according to the present invention and two igniters 4 and 5. Here sensor 3 is a belt buckle sensor which is operated using only a low sampling rate. It is therefore not necessary to frequently cause sensor 3 to take a measurement, so that it may be in a sleep mode most of the time. Igniters 4 and 5 are belt tensioners. Instead of the parallel bus system shown here, it is possible to choose a ring or a daisy chain or even a combination of various bus configurations. Control unit 1 calculates the triggering algorithm on the basis of the sensor values and transmits a triggering decision to igniters 4 and 5 if appropriate. Here bus line 2 is a two-wire line, but may alternatively also be a one-wire line.

Figure 1:
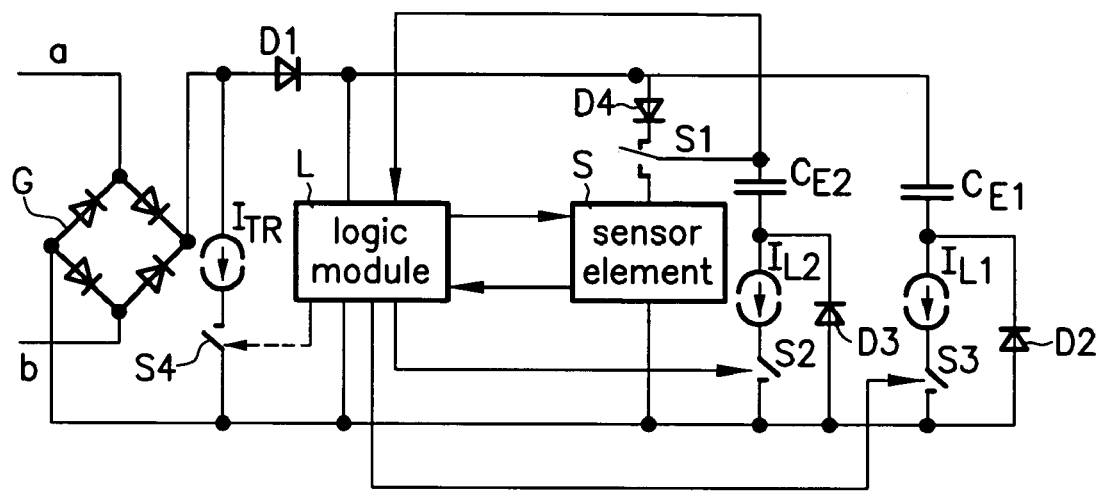
FIG. 1 shows a circuit diagram of an example sensor according to the present invention.

FIG. 1 shows a circuit diagram of the sensor according to the present invention. Two bus connections a and b are connected to a rectifier G. Since a bus system for restraint systems must have high reliability because of the necessary safety, and the bus stations connected to bus 2 are supplied with power via bus 2 in the form of direct current, one manner of error handling in the event of a short circuit in the positively biased bus lines is to reverse the polarity of the lines, so that the original ground line is used as the signal-bearing line. That makes it uncertain what polarity bus connections a and b will have. Rectifier G makes this irrelevant, however.

A switch S4 and the anode of a diode D1 are connected to rectifier G. The other side of switch S4, a logic module L, a sensor element S, a switch S2, an anode of a diode D2, a switch S3 and an anode of a diode D3 are connected to another connection of rectifier G. Another connection of logic module L, an anode of a diode D4 and a capacitor $C_{E1}$ are connected to the cathode of diode D1.

Switch S2 is connected on its other side to a capacitor $C_{E2}$ and the cathode of diode D3. Switch S3 is connected on its other side to a capacitor $C_{E1}$ and the cathode of diode D2. The cathode of diode D4 is connected to a switch S4. The other side of switch S1 leads to a second contact of sensor element S. In a first position, switch S1 connects the cathode of diode D4 to capacitor $C_{E2}$, and in a second position it connects sensor element S to capacitor $C_{E2}$. Switch S1 is controlled by logic module L through a line that is not shown here.

Also connected to capacitor $C_{E2}$ and switch S1 is a voltage monitoring line which leads to logic module L, so that voltage monitoring of capacitor $C_{E2}$ may be performed there. Sensor element S is connected to logic module L via an output through which an analog signal is transmitted by sensor element S. Sensor element S is connected to logic module L via an input. This input triggers the measurement, which is performed by sensor element S.

Logic module L is connected via a second output to switch S2, to actuate switch S2. Logic module L is connected via a third output to switch S3 to actuate switch S3. Logic module L is connected via a fourth output to switch 1 to actuate switch S1.

During a first time period, in which the sensor shown here is not measuring, switches S2 and S3 are closed so that capacitors $C_{E1}$ and $C_{E2}$ may be charged. Accordingly they are charged to a voltage around the value $U_{inactive}$. Diode D4 ensures that the capacitor does not discharge through capacitor $C_{E1}$. In addition, diode D4 causes capacitor $C_{E2}$ to charge more slowly. Moreover, switch S1 is in the upper position, so that switch S1 connects capacitor $C_{E2}$ to the cathode of diode D4. That enables capacitor $C_{E2}$ to charge with charging current $I_{L2}$. Capacitor $C_{E1}$, which is connected directly to the cathode of diode D1, charges with charging current $I_{L1}$.

Switch S4 is open, since it is closed only when the measurement result is transmitted. Switch S4 serves to modulate the power. It is also opened in the active bus phase to generate a logical 0, whereas closing S4 generates a logical 1. In this active bus phase, the voltage is $U_{active}$ on bus line 2, so that capacitors $C_{E1}$ and $C_{E2}$ are no longer being charged. These capacitors are prevented from discharging by diode D1.

Through the voltage monitoring line, logic module L recognizes when capacitor $C_{E2}$ is charged sufficiently so that a measurement using sensor element S is possible with the energy that is being charged in capacitor $C_{E2}$. When this moment has been reached, the second time period begins, and switch S1 is switched to the lower position in order to connect sensor element S to capacitor $C_{E2}$, which is now able to discharge through sensor element S and thus supplies sensor element S with electrical power. At the same time, switch S2 is opened so that capacitor $C_{E2}$ is only able to discharge through switch S1 and sensor element S. Capacitor $C_{E1}$ discharges through logic module L if switch S4 is closed and the voltage on the bus line is switched to $U_{active}$. This makes it possible for logic module L to always be supplied with electrical power. At the same time, diode D1 prevents leakage via bus lines a and b. Here the voltage level on the bus lines is switched between two levels, $U_{inactive}$ and $U_{active}$. $U_{active}$ is significantly lower than $U_{inactive}$. Since $C_{E1}$ and $C_{E2}$, as energy reserves, are charged to a voltage of around $U_{inactive}$, diode D1 acts as a barrier during the time of active data transmission, i.e., a level of $U_{active}$ on the bus line. The power source therefore acts on the bus, but not on the circuit of the sensor, which is decoupled via D1.

If the measurement has been performed using sensor element S, which is designed here as a Hall element, then sensor element S transmits via its output an analog signal corresponding to the measurement, which logic module L digitizes using an integrated analog/digital converter and stores in a register located in logic module L. But first, logic module L has transmitted via the first output a signal to sensor element S which triggers the measurement, so that the measurement by sensor element S may begin. Logic module L either sends the measurement results via connections a and b and bus 2 after the measurement is completed, or sends them upon request for example by bus master 1. To that end, switch S4 is then closed and the current $I_{TR}$ is used as the transmission current. By closing and opening switch S4 in the active bus phase ($U_{active}$ on bus line 2), digital signals can be generated. The encoding used here is the Manchester encoding.

Switches S1, S2, S3 and S4 here are designed as transistors. Diodes D1 an D2 enable capacitors $C_{E2}$ and $C_{E1}$ to be charged, and also enable the capacitors to discharge in the appropriate direction.

Here, as shown in FIG. 2, sensor 3 as well as igniters 4 and 5 are slaves in relation to bus master 1.

Figure 3:
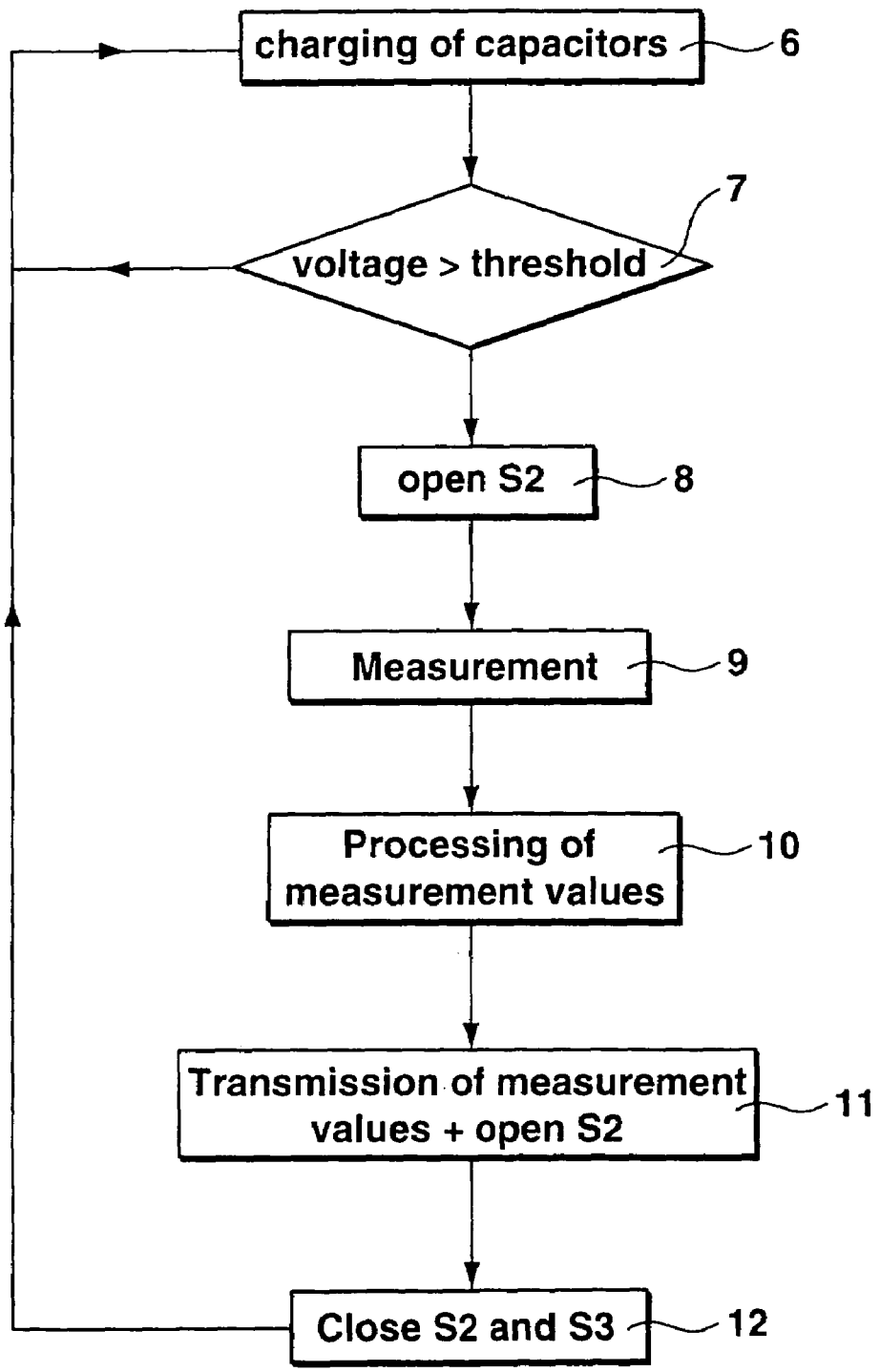
FIG. 3 shows a flow chart of an example method according to the present invention.

FIG. 3 depicts an example method according to the present invention as a flow chart. In method step 6 the energy storage devices, i.e., capacitors $C_{E1}$ and $C_{E2}$, are charged through diode D1 and through switch S1 in the upper position, as well as closed switches S2 and S3. Charging currents $I_{L1}$ and $I_{L2}$ then flow. Switch S4 on the other hand is open, so that the downstream circuit is not shorted. Logic module L has the voltage monitoring, which recognizes when capacitor $C_{E2}$ has enough power to supply sensor element S for at least one measurement. Instead of one measurement, a plurality of measurements may also be performed. Method step 7 therefore checks whether the voltage at capacitor $C_{E2}$ is higher than a prescribed threshold level. This threshold value characterizes the necessary power for sensor element S.

If this level has not been reached, the charging of capacitor $C_{E2}$ is continued in method step 6. But if the voltage is above the threshold value, in method step 8 switch S2 is opened and switch S1 is switched to the lower position, in order to supply sensor element S with power from $C_{E2}$. In addition, a signal that triggers the measurement is transmitted from logic module L to sensor element S. The actual measurement is then performed in method step 9.

In method step 10, these measurement signals are then passed from sensor element S to logic module L as analog signals. Logic module L stores the measurement signals in a register after they have been digitized. Switch S4 is then used, either upon request by bus master 1 or automatically, to transmit the measurement signal via bus 2 to bus master 1. To that end, switch S4 is opened and closed to generate digital signals. That causes transmission current $I_{TR}$ to flow. During the active bus phase, switch S3 is simultaneously opened, so that energy storage device $C_{E1}$ supplies the logic module with power during this time of bus communication. Even when capacitor $C_{E2}$ is discharging through sensor element S, capacitor $C_{E1}$ continues to be charged through connections a and b by the current present on bus 2. Only in the active bus phase does discharging of $C_{E1}$ occur, since the voltage on the bus line is then switched to $U_{active}$ and logic module L has to be supplied by $C_{E1}$.

After the transmission, switch S4 is again opened for a longer period, and switches S2 and S3 are closed and switch S1 is switched to the upper position, so that the charging of capacitors $C_{E1}$ and $C_{E2}$ may begin again. This is done in method steps 11 and 12. The method then jumps back accordingly to method step 6.

It is necessary therefore to make a distinction between active and inactive bus phases on the one hand, and the measuring phase and charging phase of $C_{E2}$ on the other hand, with $C_{E1}$ charging in the inactive bus phase. $C_{E2}$ is also able to charge only in the inactive bus phase, but also to discharge again when $C_{E2}$ has reached the predetermined voltage to enable a measurement by the sensor element.

What is claimed is:

1. A sensor adapted for connection to a bus, comprising:
   a sensor element,
   a logic module for sequence control;
   a connection to the bus;
   a first energy storage device, the sensor element being connectable to the first energy storage device;
   an arrangement configured to charge the first energy storage device via the bus in a first time period;
   an arrangement configured to supply power from the first energy storage device to the sensor element in a second time period; and
   a power monitoring device configured to monitor the charging of the first energy storage device;
   wherein the first time period and the second time period are in sequential order.

2. The sensor as recited in claim 1, further comprising:
   a second energy storage device configured to supply power to the logic module during a bus communication.

3. The sensor as recited in claim 1, wherein the logic module includes the power monitoring device, and is designed as a voltage monitoring device.

4. The sensor as recited in claim 2, wherein the first energy storage device and second energy storage device are capacitors.

5. The sensor as recited in claim 1, wherein the logic module is configured to store signals from the sensor element and to transmit them via the bus.

6. A method for supplying power to a sensor which is connected to a bus, a logic module being connected to a bus line to be supplied with power during a first time period, the method comprising:
   charging a first energy storage device of a sensor element of the sensor in a first time period, while a power monitoring device monitors the charging; and
   supplying power to the sensor element by the first energy storage device in a second time period;
   wherein the first time period and the second time period are in sequential order.

7. The method as recited in claim 6, further comprising:
   charging a second energy storage device, the second energy storage device supplying power to the logic module during a bus communication.

* * * * *